(12) United States Patent
Glass

(10) Patent No.: US 9,885,479 B2
(45) Date of Patent: Feb. 6, 2018

(54) HANDS-FREE STRIKER FOR LIGHTING A TORCH

(71) Applicant: Billy L. Glass, Waverly, OH (US)

(72) Inventor: Billy L. Glass, Waverly, OH (US)

(73) Assignee: Balt Designs, LLC, Waverly, OH (US)

( * ) Notice: Subject to any disclaimer, the term of this patent is extended or adjusted under 35 U.S.C. 154(b) by 0 days.

(21) Appl. No.: 15/436,949

(22) Filed: Feb. 20, 2017

(65) Prior Publication Data

US 2017/0159934 A1 Jun. 8, 2017

Related U.S. Application Data

(63) Continuation of application No. 14/712,355, filed on May 14, 2015, now Pat. No. 9,573,608.

(60) Provisional application No. 61/993,416, filed on May 15, 2014.

(51) Int. Cl.
| | | |
|---|---|---|
| B62B 1/00 | (2006.01) |
| F23Q 1/02 | (2006.01) |
| B62B 1/14 | (2006.01) |
| B62B 1/26 | (2006.01) |

(52) U.S. Cl.
CPC ............ *F23Q 1/02* (2013.01); *B62B 1/14* (2013.01); *B62B 1/264* (2013.01); *B62B 2202/022* (2013.01)

(58) Field of Classification Search
CPC .. B62B 1/264; B62B 1/14; B62B 1/00; B62B 1/06; B62B 1/186; B62B 1/12; B62B 3/00; B62B 3/02; B62B 3/04; B62B 3/12; B62B 3/104; B62B 2202/02; B62B 2202/022; F23Q 1/06; F23Q 1/00; F23Q 1/02; F23Q 1/04
See application file for complete search history.

(56) References Cited

U.S. PATENT DOCUMENTS

| | | | | |
|---|---|---|---|---|
| 1,244,030 A | | 10/1917 | Cave | |
| 1,685,633 A | * | 9/1928 | Heybach | F23Q 2/16 431/254 |
| 2,384,844 A | * | 9/1945 | Malmquist | F23Q 1/06 431/273 |
| 2,826,904 A | * | 3/1958 | Williamson | F23Q 2/48 431/142 |
| 3,052,112 A | * | 9/1962 | Wheeler | B23K 5/22 431/143 |
| 4,231,734 A | | 11/1980 | Burns | |
| 4,253,716 A | | 3/1981 | Turner, Jr. | |
| RE31,316 E | * | 7/1983 | Moore | F23Q 1/06 431/254 |
| 4,432,470 A | | 2/1984 | Sopha | |
| 4,459,096 A | * | 7/1984 | Fischer | F23Q 1/06 431/273 |
| 4,486,044 A | | 12/1984 | Gordon | |
| 4,516,308 A | * | 5/1985 | Urban | B23Q 39/00 228/45 |

(Continued)

*Primary Examiner* — James M Dolak
(74) *Attorney, Agent, or Firm* — Fay Sharpe LLP; James E. Scarbrough

(57) ABSTRACT

A hands-free striker assembly for use with a torch cart for igniting a torch attached to the torch cart. The hands-free striker has a mounting body mounted to the torch cart having a striker tip for lighting the torch. The hands-free striker also has a friction pad for lighting the torch by passing the torch over the friction pad and into contact with the striker tip.

8 Claims, 7 Drawing Sheets

(56) References Cited

U.S. PATENT DOCUMENTS

| | | | |
|---|---|---|---|
| 4,573,665 A | 3/1986 | Stroh et al. | |
| 4,625,949 A | 12/1986 | Walker | |
| 4,764,657 A * | 8/1988 | Fukukawa | B21C 37/08 |
| | | | 219/124.1 |
| 4,932,394 A | 6/1990 | Nanaumi | |
| 5,078,415 A | 1/1992 | Goral | |
| D323,838 S * | 2/1992 | Rebstock | D15/144 |
| 5,307,839 A | 5/1994 | Loebker et al. | |
| 5,660,317 A * | 8/1997 | Singer | B23K 23/00 |
| | | | 164/342 |
| 6,109,544 A | 8/2000 | Sheng | |
| 6,116,623 A | 9/2000 | Salvucci | |
| 6,334,622 B1 | 1/2002 | Romero | |
| 6,930,282 B1 | 8/2005 | Di Novo et al. | |
| 7,122,147 B2 | 10/2006 | Wakeman et al. | |
| 7,128,569 B2 * | 10/2006 | Little | F23Q 1/06 |
| | | | 431/274 |
| 7,252,297 B1 | 8/2007 | Barritt et al. | |
| 7,438,084 B2 | 10/2008 | Trettin et al. | |
| 8,167,322 B2 | 5/2012 | Greene | |
| 8,398,097 B2 | 3/2013 | Junk | |
| 8,809,741 B2 | 8/2014 | Feldhausen | |
| 8,895,895 B2 | 11/2014 | Feldhausen | |
| 8,937,265 B2 | 1/2015 | Feldhausen | |
| 8,937,266 B2 | 1/2015 | Feldhausen | |
| 8,967,634 B2 | 3/2015 | Barnes et al. | |
| 9,254,856 B2 | 2/2016 | Oachs | |
| 9,266,545 B2 | 2/2016 | Robinson | |
| 9,302,688 B2 | 4/2016 | Reddi | |
| 9,399,265 B2 * | 7/2016 | Duart Ivarez | |
| | | Cienfuegos | B23K 23/00 |
| 9,409,249 B1 * | 8/2016 | Trussell | B23K 37/0533 |
| 9,751,161 B2 * | 9/2017 | Stewart | B23K 37/0294 |
| 2004/0245680 A1 | 12/2004 | Wakeman et al. | |
| 2005/0168002 A1 | 8/2005 | Herring | |
| 2008/0230669 A1 | 9/2008 | Brady | |
| 2009/0282707 A1 | 11/2009 | Shenouda | |
| 2016/0107271 A1 | 4/2016 | Stewart | |
| 2017/0089576 A1 * | 3/2017 | Morehead | F23Q 1/02 |

* cited by examiner

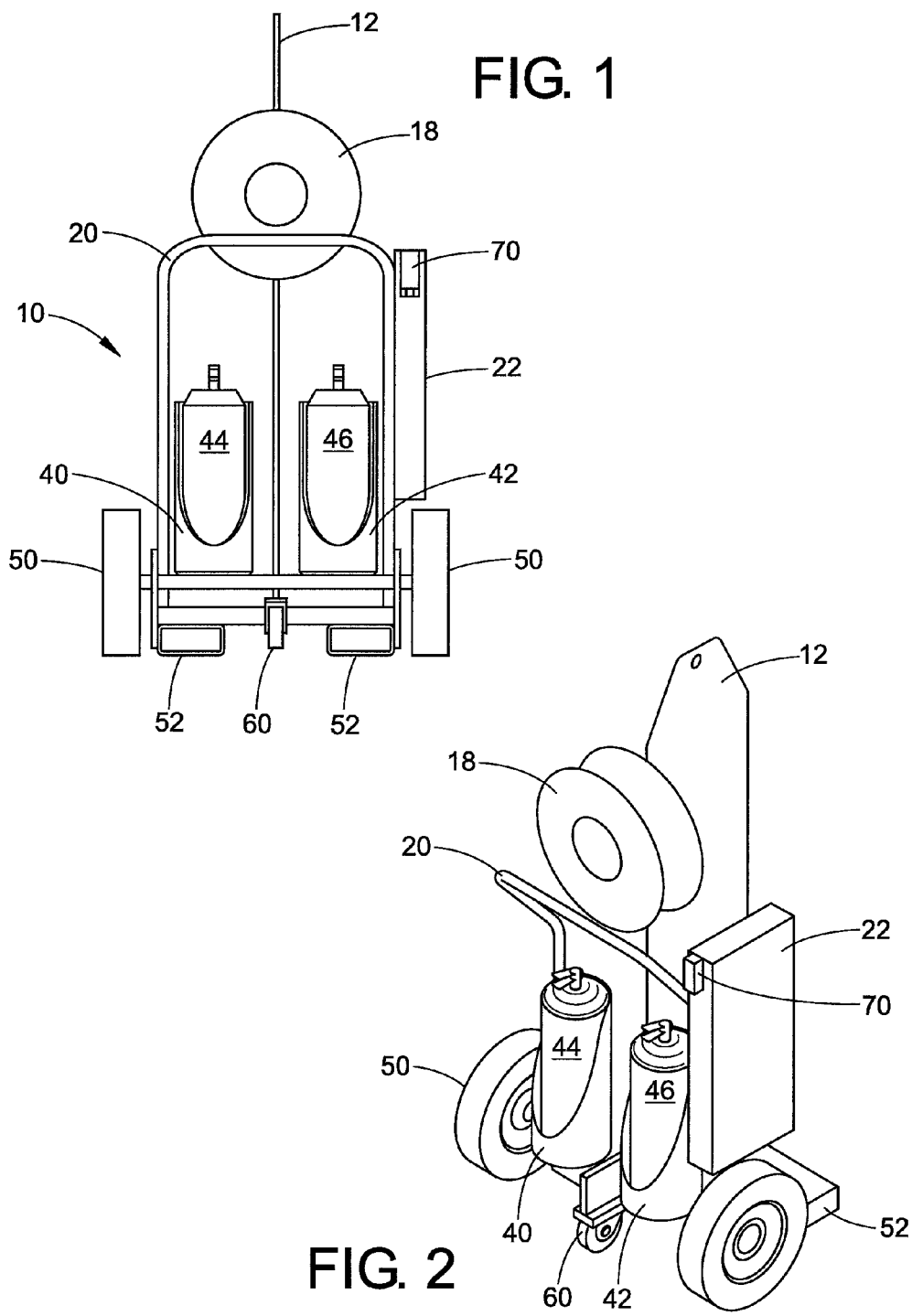

HANDS-FREE STRIKER FOR LIGHTING A TORCH

CLAIM OF PRIORITY

This application is a continuation application of application Ser. No. 14/712,355 filed on May 14, 2015, which will issue as U.S. Pat. No. 9,573,608 on Feb. 21, 2017, and which claims priority to provisional patent application Ser. No. 61/993,416 filed on May 15, 2014, which is incorporated by reference herein.

BACKGROUND OF THE DISCLOSURE

The disclosure relates to a striker assembly. More specifically, it relates to a hands free striker which can be used alone or with a torch cart for storing and transporting pressurized liquid or gas storage tanks and related equipment.

Tanks for storing and dispensing pressurized gas and/or liquid, such as oxygen and acetylene or propane tanks are commonly used in a wide variety of industrial, medical and other applications. A typical storage tank comprises a hollow cylinder made of steel or other rigid impermeable material that stores the gas or liquid under relatively high pressure. A valve assembly is in fluid flow communication with the tank and may include a regulator to control the flow of fluid from the tank and a gauge to monitor the fluid level and/or pressure. A supply hose is connected to the output port of the valve assembly for dispensing the fluid.

Often storage tanks are used in an environment where the fluid stored in the tank is used in conjunction with other equipment for performing a particular function. Example environments are welding and electrical work where a tank storing liquid fuel such as acetylene or propane is used along with a tank storing oxygen.

Such applications also require other related equipment and accessories such as brazing rods, pipe fittings, solder, flux, hand tools, torch heads or the like. Because the typical filled storage tanks are heavy and difficult to transport and a wide variety of related equipment may be required at the work site, it is difficult and cumbersome for a worker to easily and conveniently transport the tanks and related accessories and equipment from one work site to another.

Some existing torch carts are provided with a separate torch igniter which must be hand-held to ignite the torch. This often proves to be difficult for the user who has to hold both the torch and the striker at the same time. Thus, there is a need to provide a hands-free striker which can be provided with the torch cart to enable the user to easily light or ignite the torch while keeping their hands free for holding the torch, etc.

SUMMARY OF THE DISCLOSURE

The present disclosure relates to a torch striker. More specifically, it relates to a hands free striker for lighting a torch which may be provided with a torch cart which facilitates storage of several storage tanks and related equipment. The disclosure relates to a compact torch cart apparatus which brings together a unique combination of features in one torch cart which is not available in existing carts. Such features include essential tools used or required by welders or other industrial workers which come together to provide a versatile work station. The main components which are included with the torch cart include but are not limited to: a) a fire barrier, b) a hose reel, c) a base unit, d) a lockable storage box, e) fire extinguishers, f) flat free tires, g) fork truck pockets, h) third support wheel, and i) a hands-free mechanical striker.

The combination of these components located on a single torch cart is believed to be particularly unique, including three components on the back of the torch cart (the fire extinguishers, hose reel, and third support wheel) combined with the lockable storage box, front fork truck pockets, and the hands-free mechanical striker. Such a torch cart assembly will save set-up and breakdown time and reduce time needed to transport and use the equipment, thus increasing time efficiency, reducing costs, decreasing the risk of safety violations, and securely storing valuable tools.

A preferred embodiment of the disclosure is a hands-free striker assembly for use with a torch cart, including a hands-free striker mounted to the torch cart for igniting a torch attached to the torch cart; wherein the hands-free striker includes a mounting body mounted to the torch cart having a striker tip for lighting the torch; and wherein the hands-free striker further includes a friction pad for lighting the torch by passing the torch over the friction pad and into contact with the striker tip.

Another embodiment of the disclosure is a method of igniting a torch without holding a torch striker, comprising; mounting the striker to a torch cart; providing a hands-free striker having a body; providing a striker tip and a friction pad at separate ends of the striker; passing a torch into contact with the friction pad and into contact with the striker tip for igniting the torch.

Another embodiment of the disclosure is a torch cart including a base for supporting first and second storage tanks; a wall provided between the tanks for separating the tanks; a container for housing a torch; at least one holster for holding at least one fire extinguisher; and a hands-free striker mounted to the cart for igniting the torch.

Another embodiment of the disclosure is a hands-free striker assembly for igniting a torch which is provided separately from a torch cart.

Still other embodiments of the disclosure will be apparent upon a reading and understanding of the following detailed disclosure.

BRIEF DESCRIPTION OF THE DRAWINGS

Embodiments of the present disclosure are described with reference to the following figures:

FIG. 1 is a front elevational view of a torch cart in accordance with a preferred embodiment of the disclosure;

FIG. 2 is a front perspective view of the torch cart of FIG. 1;

DETAILED DESCRIPTION OF THE DISCLOSURE

Figure 3:
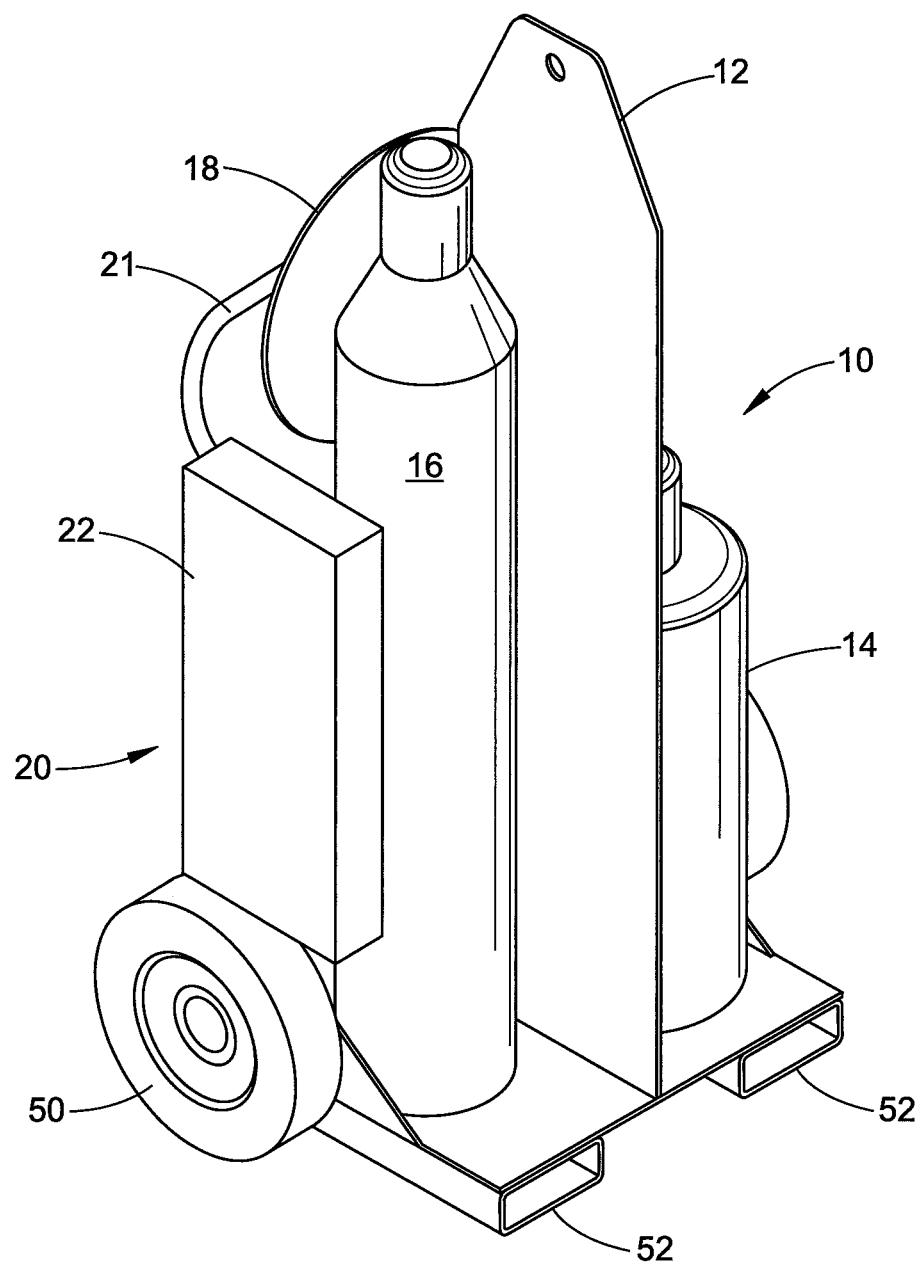
FIG. 3 is another front perspective view of the torch cart of FIG. 1.

The present disclosure relates to a torch striker assembly. More specifically, it relates a hands-free striker used for igniting a torch provided with a torch cart which facilitates storage of several storage tanks and related equipment. The disclosure further relates to a compact torch cart apparatus which brings together a unique combination of features in one torch cart not provided in existing carts. Such features include essential tools used or required by welders or other industrial workers which come together to provide a versatile work station. The main components which are included with the torch cart include but are not limited to: a) a fire barrier, b) a hose reel, c) a base unit, d) a lockable storage box, e) fire extinguishers, f) flat free tires, g) fork truck pockets, h) third support wheel, and i) a hands-free mechanical striker.

The combination of these components located on a single torch cart is unique, including three components on the back of the torch cart (the fire extinguishers, hose reel, and third support wheel) combined with the lockable storage box, front fork truck pockets, and the hands-free mechanical striker. Such a torch cart assembly will increase efficient use by reducing set-up and breakdown time and reduce time needed to transport and use the equipment, thus increasing time efficiency, reducing costs, decreasing the risk of safety violations, and securely storing valuable tools.

Referring now to FIGS. 1-8, a torch cart 10 in accordance with a preferred embodiment of the disclosure is shown. Specifically, referring to FIGS. 2 and 3, torch cart 10 has a metal fire barrier or wall 12 such as made of steel which is positioned between and designed to separate oxygen tanks 14 and acetylene tanks 16 thereby bringing the cart into compliance with OSHA, UFC, CGA and NFPA safety standards. The firewall 12 facilitates the storage of fuel and oxygen cylinders together and in a side by side fashion in an efficient and safe manner that complies with OSHA standard 1910.253(b)(4)(iii) and NFPA 55-7.1.6.2.1. Oxygen tanks 16 can hold up to 122 cf to 330 cf of oxygen. Acetylene tanks 14 preferably can hold #3, #4, #4M or #5 tanks. The numbers refer to the size of tanks. For example, #4 refers to a height 39.5 inches, eight of 73 pounds and a normal volume of 140 cubic feet.

Figure 4:
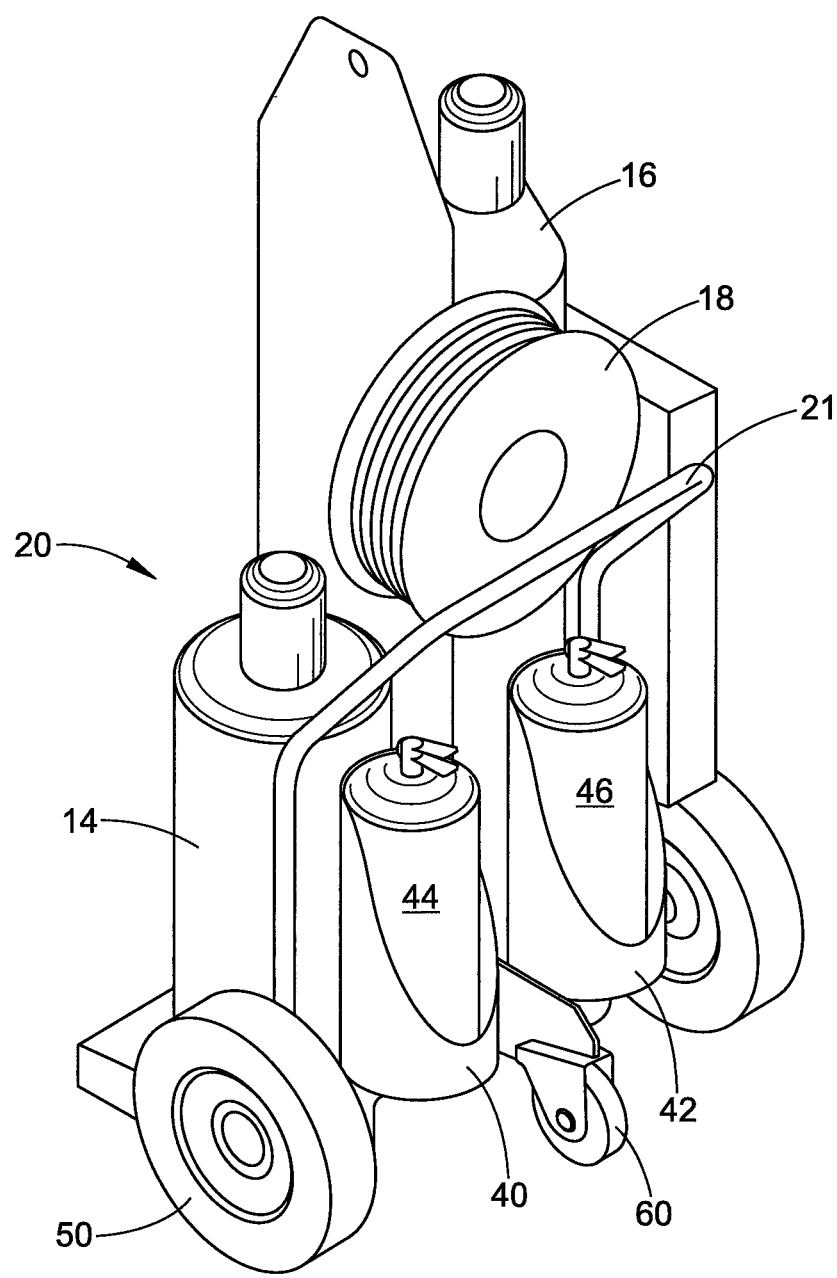
FIG. 4 is a rear perspective view of the torch cart of FIG. 1.
Figure 5:
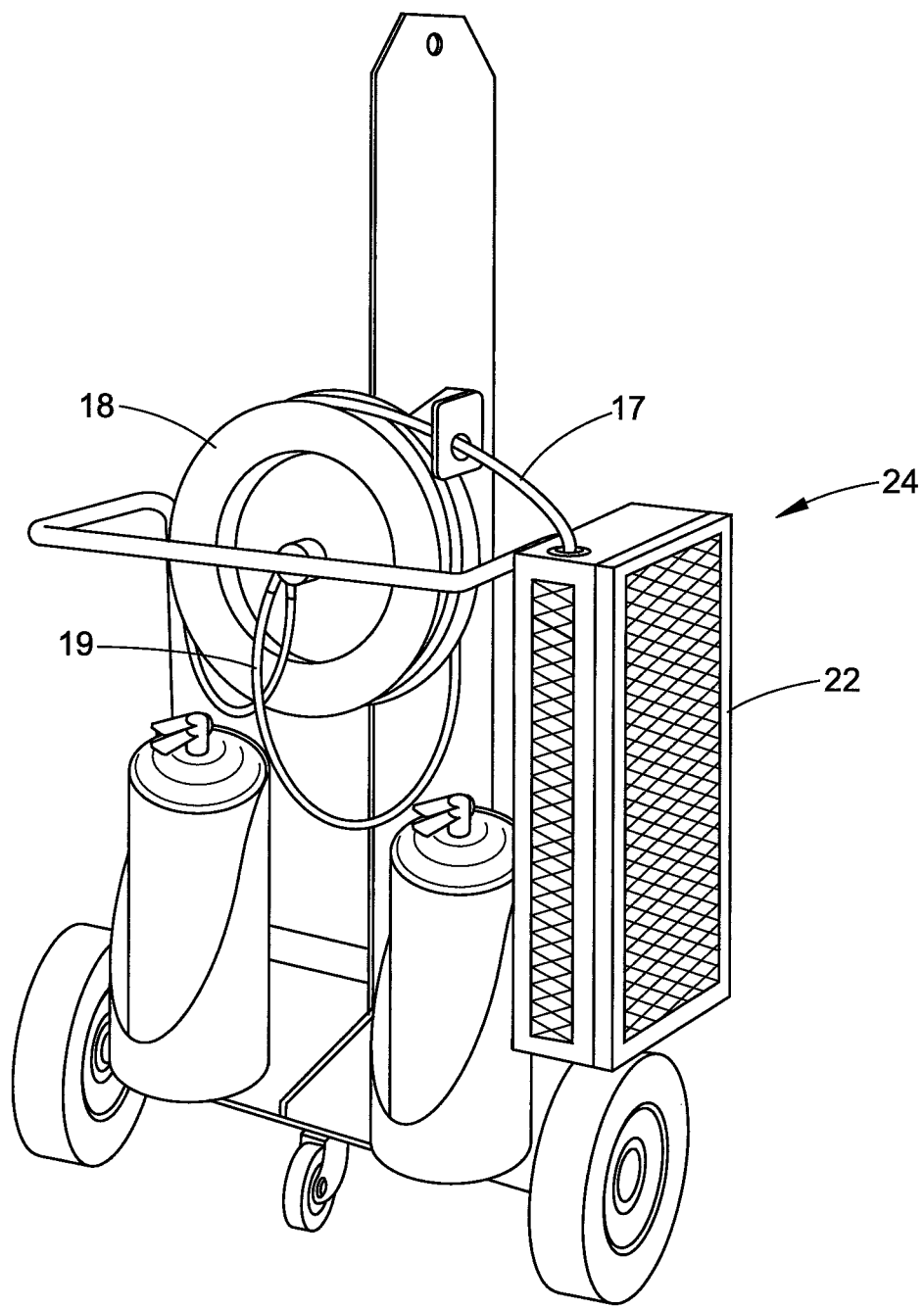
FIG. 5 is another rear perspective view of the torch cart of FIG. 1.

Referring to FIGS. 2, 4, and 5, the torch cart is also equipped with a hose reel 18 having retractable dual hoses 17, 19 which may be acquired from a third party and mounted to the cart. Hoses 17, 19 can be connected to one of the oxygen tanks 16 and acetylene tank 14 and to a torch 30.

Referring to FIGS. 1, 2, 3, and 4, base unit 20 is the body or housing of the cart to which all of the components are mounted. The base 20 has an ergonomic handle 21 mounted on a rear portion of the cart to facilitate moving the cart.

Figure 6:
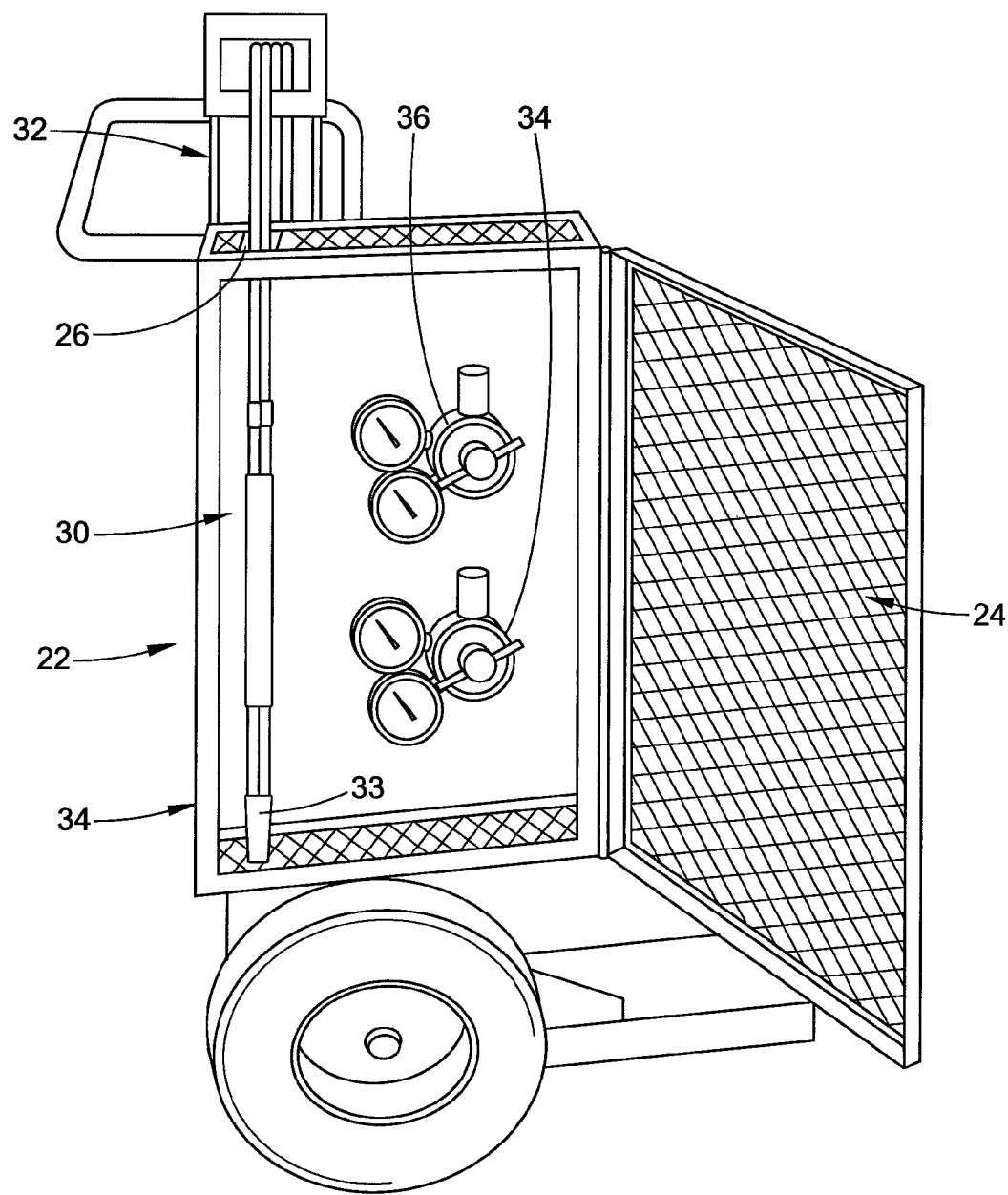
FIG. 6 is a side view of the storage box of the torch cart of FIG. 1 in an opened configuration.

Referring to FIGS. 3, 5, and 6, a lockable storage box 22 is preferably constructed of mesh steel 24 and features a slot 26 which allows operator to secure torch 30 in the box without the need to disconnect it from hose 17. Hangers 34 for gauges 36 are located on the inside of the box 22.

Referring to FIGS. 1, 2, and 4, attached to the rear base of the torch cart are two holsters 40, 42 for holding and storing two fire extinguishers 44, 46. The fire extinguishers 44, 46 are provided to be in compliance with OSHA standard 1926.352(d). Fire extinguisher 44 is a water fire extinguisher while fire extinguisher 46 is an ABC fire extinguisher. For example, an ABC fire extinguisher is classified by fire type. "A" stands for trash, wood, paper, "B" is for liquids and "C" is for electrical equipment.

Referring to FIGS. 1, 2, and 3, another aspect of the disclosure is flat free tires 50 which are provided which minimize the downtime required to replace the tires.

Referring to FIGS. 1 and 3, fork truck pockets 52 are attached to the base unit 44, 46 as two tube steel pockets that are designed to accommodate a fork truck for lifting and transporting the cart.

Referring to FIGS. 1, 2, and 4, a third wheel 60 in the form of a support wheel is located on the back side of the cart and is designed to allow one person to tilt a loaded cart onto its wheels without danger of over-tipping.

Figure 7:
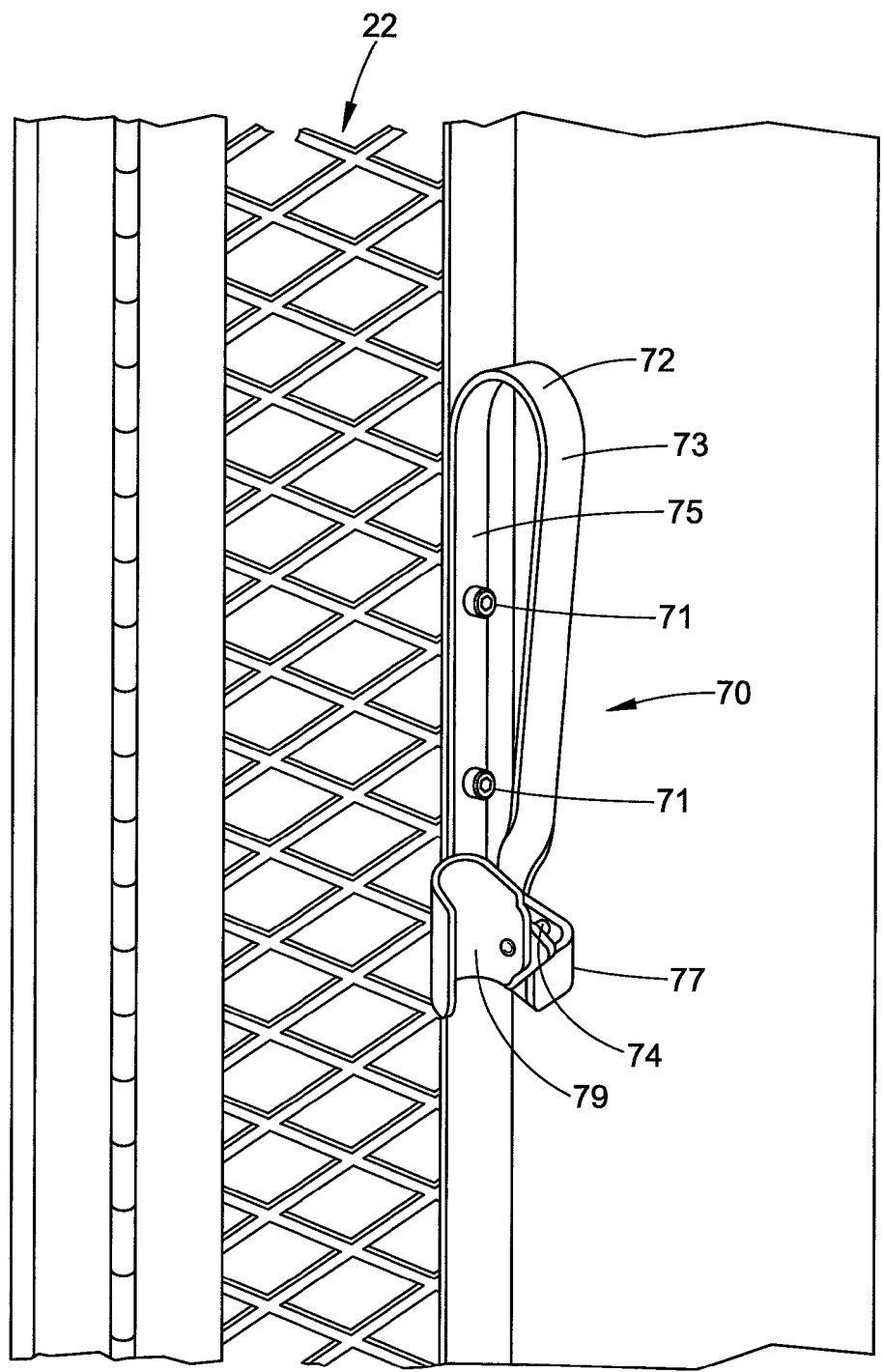
FIG. 7 is a side perspective view of a hands-free striker in accordance with a preferred embodiment of the disclosure.
Figure 8:
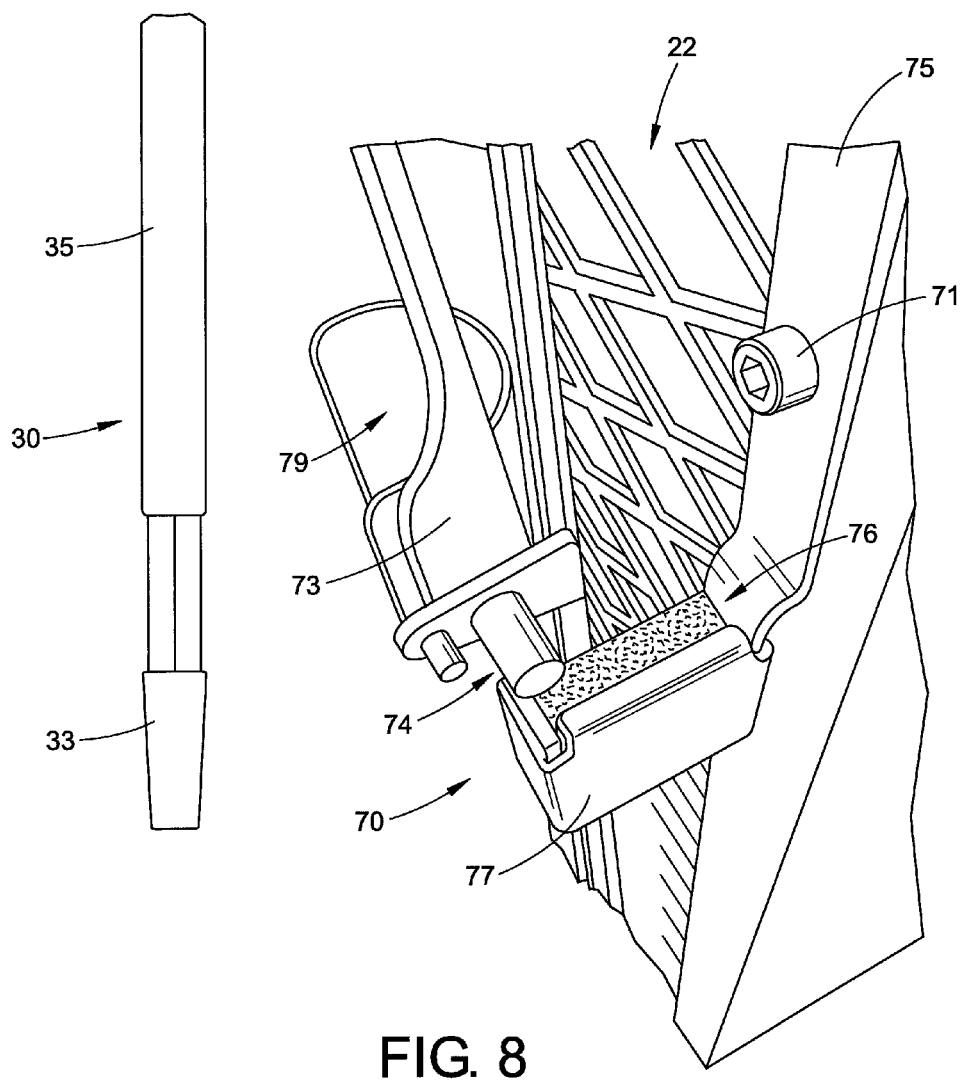
FIG. 8 is another side perspective view of the striker.

In accordance with a preferred embodiment of the disclosure, referring now to FIGS. 7 and 8, a striker 70 in the form of a mechanical hands-free striker can be mounted directly to the cart on storage box 22. This allows the worker to ignite the wand of the torch 30 by inserting a tip 33 of the torch wand 35 into the device such as within torch receiving wall 79 and a striker tip 74 and friction pad 76 thus activating thus the striker and igniting the torch.

The striker includes a body 72 which is preferably formed of bent metal forming an inverted u-shape having a first member 73 and a second member 75 as seen in FIG. 7. The striker can be bolted or otherwise mounted to the cart storage box such as via fasteners 71 extending along member 75.

The striker tip 74 itself is positioned at the end of member 73 and can be adjacent torch receiving wall 79 and is specifically configured for lighting a torch wand against a friction pad 76 positioned within bottom wall portion 77 of member 75. Specifically, the tip 44 is positioned over pad 76. During use the torch tip 33 passes over the friction pad 76 and is immediately ignited at tip 74 of the striker.

The striker can be used with other configurations of torch carts and is not limited to this cart. Also, the striker can be provided, separately as a separate unit and mounted on the cart at the worksite, or can be provided on a separate cart or apparatus independent of the torch cart.

The exemplary embodiment has been described with reference to the preferred embodiments. Obviously, modifications and alterations will occur to others upon reading and understanding the preceding detailed description. It is intended that the exemplary embodiment and appended claims be construed as including all such modifications and alterations.

The invention claimed is:

1. A hands-free striker assembly for use with an associated torch cart, comprising:
    a hands-free striker mounted to said associated torch cart for igniting an associated torch attached to said torch cart, said striker comprises a body having a first arm member extending vertically and a second arm member extending vertically with a curved portion extending between and connecting said first arm member and said second arm member;
    wherein said hands-free striker first arm member has a striker tip for lighting said torch and a torch receiving wall formed at an opposite side of said first arm member; and
    wherein said hands-free striker second arm member comprises a friction pad for lighting said torch by passing said torch positioned within said torch receiving wall of said first arm member over said friction pad and into contact with said striker tip.

2. The hands-free striker assembly of claim 1, wherein said body is formed of bent metal.

3. The hands-free striker assembly of claim 2, wherein said torch receiving wall is formed at an end of said first arm member.

4. The hands-free striker assembly of claim 3, wherein said striker tip is attached to said end of said first arm member adjacent said torch receiving wall.

5. The hands-free striker assembly of claim 1, wherein said second arm member comprises a bottom wall portion to which said friction pad is mounted.

6. The hands-free striker assembly of claim 1, wherein said striker is mounted directly to an associated storage box on said torch cart.

7. The hands-free striker assembly of claim 1, wherein said striker assembly is bolted to said torch cart via fasteners extending through said second arm member.

8. The hands-free striker assembly of claim 1, wherein said striker assembly is mounted to said torch cart.

* * * * *